United States Patent
Nitschke et al.

(10) Patent No.: US 10,246,364 B2
(45) Date of Patent: Apr. 2, 2019

(54) METHOD FOR THREE STAGE FORMING A HOT GLASS SHEET WITH TRANSVERSE CURVATURE

(71) Applicant: GLASSTECH, INC., Perrysburg, OH (US)

(72) Inventors: Dean M. Nitschke, Maumee, OH (US); Jeffrey A. Grzeszczak, Sylvania, OH (US); Ashoka G. Jinka, Maumee, OH (US); James P. Schnabel, Jr., Holland, OH (US); David B. Nitschke, Perrysburg, OH (US)

(73) Assignee: GLASSTECH, INC., Perrysburg, OH (US)

( * ) Notice: Subject to any disclaimer, the term of this patent is extended or adjusted under 35 U.S.C. 154(b) by 37 days.

(21) Appl. No.: 15/245,686

(22) Filed: Aug. 24, 2016

(65) Prior Publication Data
US 2016/0362324 A1 Dec. 15, 2016

Related U.S. Application Data

(62) Division of application No. 14/174,265, filed on Feb. 6, 2014, now Pat. No. 9,452,948.

(51) Int. Cl.
*C03B 23/025* (2006.01)
*C03B 23/035* (2006.01)
(Continued)

(52) U.S. Cl.
CPC ........ *C03B 23/0252* (2013.01); *C03B 23/025* (2013.01); *C03B 23/03* (2013.01);
(Continued)

(58) Field of Classification Search
CPC ... C03B 23/025; C03B 23/0252; C03B 23/03; C03B 23/0302; C03B 23/0355; C03B 23/0357; C03B 35/147; C03B 35/202
See application file for complete search history.

(56) References Cited

U.S. PATENT DOCUMENTS

| 3,806,312 A | 4/1974 | McMaster et al. |
| 3,934,970 A | 1/1976 | McMaster et al. |

(Continued)

FOREIGN PATENT DOCUMENTS

| CN | 101291883 A | 10/2008 |
| DE | 4334213 A1 | 4/1995 |

(Continued)

OTHER PUBLICATIONS

Supplementary European Search Report dated Jul. 5, 2017, European Application No. 15 747 024.6, Applicant Glasstech, Inc., 13 Pages.

(Continued)

*Primary Examiner* — Queenie S Dehghan
(74) *Attorney, Agent, or Firm* — Brooks Kushman P.C.

(57) ABSTRACT

A glass sheet forming method utilizes first and second upper molds and a lower mold to provide three stage forming. The glass is curved on the upper mold in the first stage but retains straight line elements transverse to the curvature. Transfer of the initially formed glass sheet from the first upper mold to the lower mold then provides the second stage of gravity forming and the glass sheet is then press formed between the second upper mold and the lower mold in the third stage which reduces optical distortion in the central viewing area of the formed glass sheet. In one embodiment the glass sheet is moved horizontally on the lower mold, and in another embodiment the glass sheet is moved horizontally on the first upper mold.

5 Claims, 8 Drawing Sheets

(51) Int. Cl.
*C03B 23/03* (2006.01)
*C03B 35/14* (2006.01)
*C03B 35/20* (2006.01)

(52) U.S. Cl.
CPC ...... *C03B 23/0302* (2013.01); *C03B 23/0355* (2013.01); *C03B 23/0357* (2013.01); *C03B 35/147* (2013.01); *C03B 35/202* (2013.01)

(56) References Cited

U.S. PATENT DOCUMENTS

| | | | |
|---|---|---|---|
| 3,947,242 | A | 3/1976 | McMaster et al. |
| 3,994,711 | A | 11/1976 | McMaster |
| 4,202,681 | A | 5/1980 | McMaster et al. |
| 4,204,854 | A | 5/1980 | McMaster et al. |
| 4,222,763 | A | 9/1980 | McMaster et al. |
| 4,252,552 | A | 2/1981 | Frank |
| 4,265,650 | A | 5/1981 | Reese et al. |
| 4,285,715 | A | 8/1981 | Frank |
| 4,356,018 | A | 10/1982 | McMaster |
| 4,514,208 | A | 4/1985 | Nitschke |
| 4,575,390 | A | 3/1986 | McMaster |
| 4,609,391 | A | 9/1986 | McMaster |
| 4,661,141 | A | 4/1987 | Nitschke et al. |
| 4,979,977 | A * | 12/1990 | Frank ............... C03B 23/0252 65/103 |
| 5,004,491 | A | 4/1991 | McMaster et al. |
| 5,071,461 | A | 12/1991 | Hirotsu et al. |
| 5,286,271 | A | 2/1994 | Rueter et al. |
| 5,330,550 | A * | 7/1994 | Kuster ............... C03B 23/03 65/260 |
| 5,441,551 | A | 8/1995 | Ollfisch et al. |
| 5,858,047 | A | 1/1999 | Frank et al. |
| 5,900,034 | A * | 5/1999 | Mumford ............ C03B 23/0302 414/222.01 |
| 5,906,668 | A | 5/1999 | Mumford et al. |
| 5,917,107 | A | 6/1999 | Ducat et al. |
| 5,925,162 | A | 7/1999 | Nitschke et al. |
| 6,032,491 | A | 3/2000 | Nitschke et al. |
| 6,079,094 | A | 6/2000 | Ducat et al. |
| 6,173,587 | B1 | 1/2001 | Mumford et al. |
| 6,418,754 | B1 | 7/2002 | Nitschke et al. |
| 6,718,798 | B2 | 4/2004 | Nitschke et al. |
| 6,729,160 | B1 | 5/2004 | Nitschke et al. |
| 8,132,428 | B2 | 3/2012 | Vild et al. |
| 2007/0089459 | A1 | 4/2007 | Vild et al. |
| 2008/0190143 | A1 * | 8/2008 | Balduin ............ C03B 23/0252 65/106 |
| 2008/0245107 | A1 | 10/2008 | Bennett et al. |
| 2010/0236290 | A1 | 9/2010 | Fukami et al. |
| 2013/0313852 | A1 | 11/2013 | Balduin et al. |

FOREIGN PATENT DOCUMENTS

| | | |
|---|---|---|
| EP | 0139524 A2 | 5/1985 |
| EP | 0668249 A2 | 8/1995 |
| EP | 1550639 A1 | 7/2005 |
| EP | 2 025 648 A1 | 2/2009 |
| JP | S 60-108329 A | 6/1985 |
| JP | S 61-132529 A | 6/1986 |
| JP | H 7-267633 A | 10/1997 |
| JP | 2009-512617 A | 3/2009 |
| JP | 2010-531797 A | 9/2010 |
| RU | 2 094 398 C1 | 10/1997 |
| WO | 9837029 A1 | 8/1998 |
| WO | 2004/046052 A1 | 6/2004 |
| WO | 2007/050297 A2 | 5/2007 |
| WO | 2007050297 A2 | 5/2007 |
| WO | 2008/124258 A1 | 10/2008 |
| WO | 2011/127024 A1 | 10/2011 |

OTHER PUBLICATIONS

PCT International Search Report and Written Opinion of the International Searching Authority dated Apr. 17, 2015, Application No. PCT/US15/11520, Applicant Glasstech, Inc., 5 Pages.
Australian Examination Report No. 1 dated Dec. 17, 2017, Application No. 2015214591, Applicant Glasstech, Inc., 3 Pages.
Russian Search Report dated May 14, 2018, Application No. 2016133289/03(051586), 2 Pages.
Russian Office Action dated Aug. 14, 2018, Application No. 2016133289/03(051586), 4 Pages.
Chinese Office Action dated May 25, 2018, Application No. 201580007722.2, 14 Pages.
Australian Examination Report No. 2 dated May 8, 2018, Application No. 2015214591, 3 Pages.
Taiwanese Search Report dated Apr. 20, 2018, Application No. 104103025, 1 Page.
Taiwanese Office Action dated Apr. 23, 2018, Application No. 104103025, 3 Pages.
Japanese Notice of Rejection Dated Oct. 30, 2018, Application No. 2016-549554, 3 Pages.

* cited by examiner

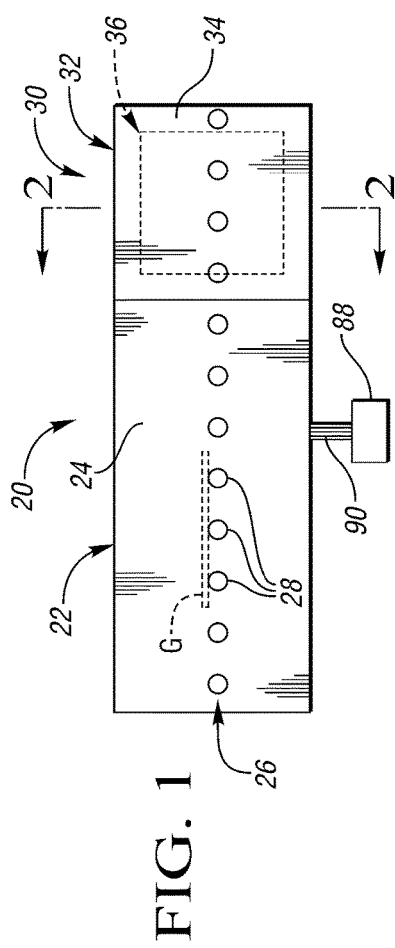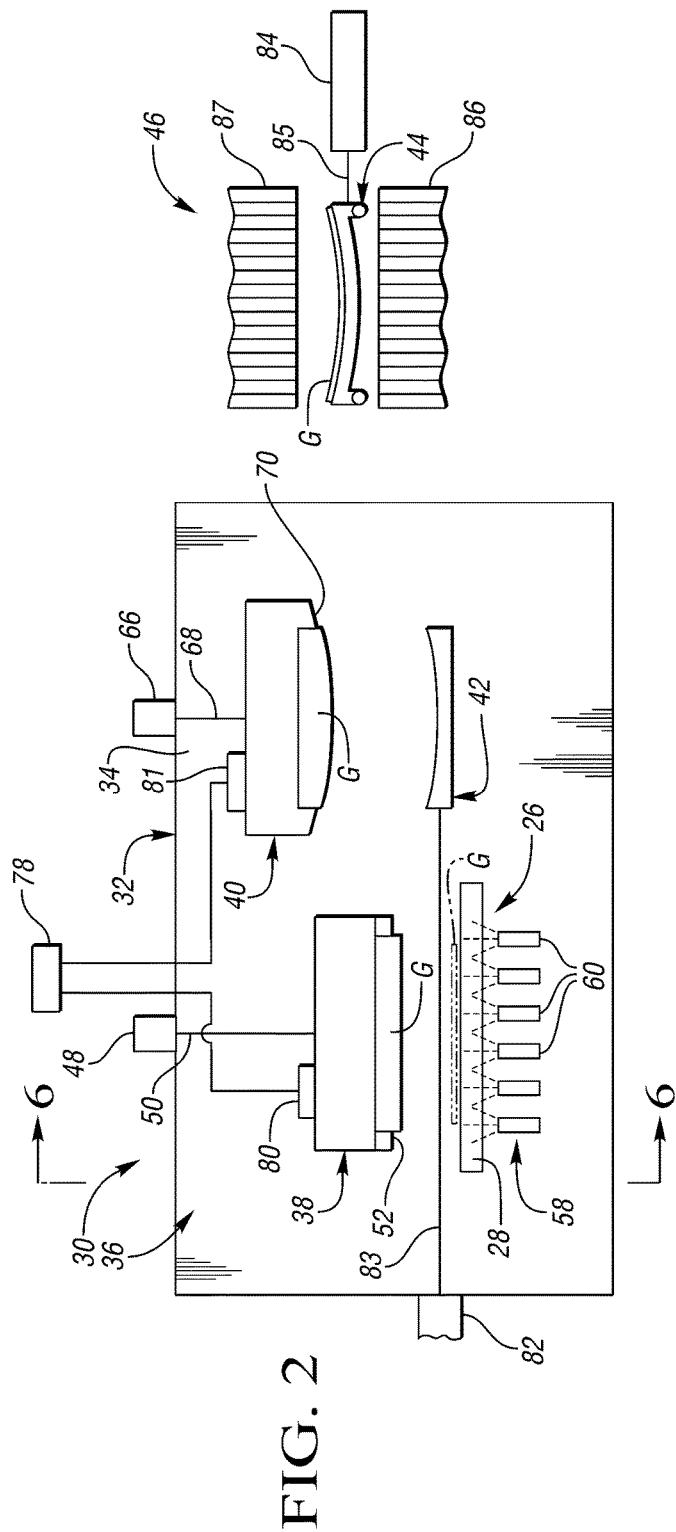

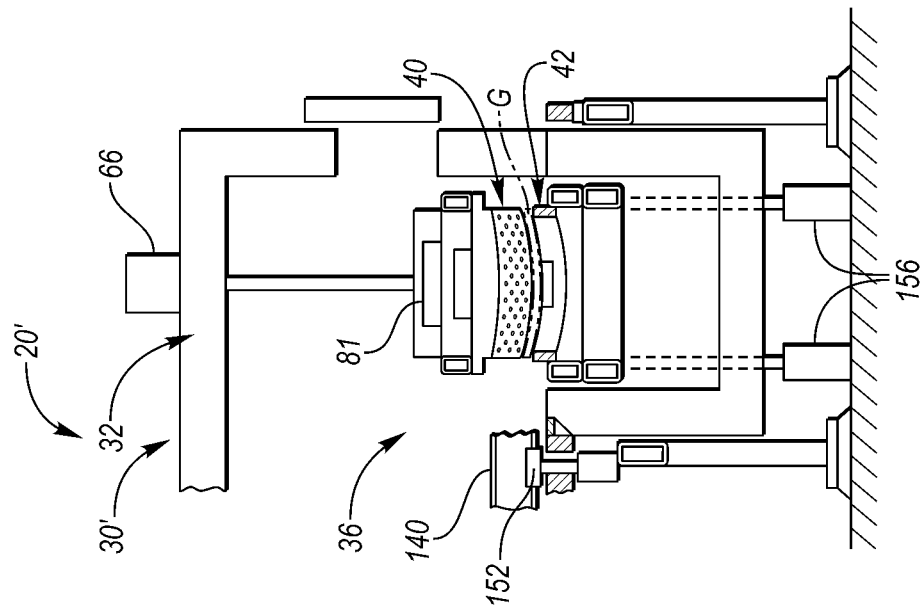
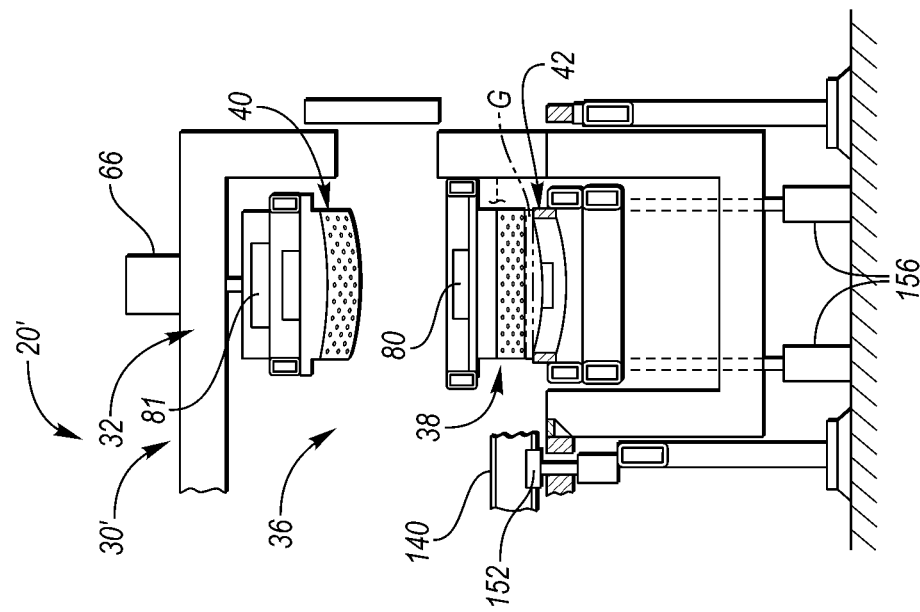

METHOD FOR THREE STAGE FORMING A HOT GLASS SHEET WITH TRANSVERSE CURVATURE

CROSS-REFERENCE TO RELATED APPLICATIONS

This application is a divisional of U.S. application Ser. No. 14/174,265 filed Feb. 6, 2014, the disclosure of which is hereby incorporated in its entirety by reference herein.

TECHNICAL FIELD

This invention relates to a three stage forming method for forming a hot glass sheet with transverse curvature having improved optics.

BACKGROUND

U.S. Pat. No. 4,661,141 Nitschke et al. discloses a glass sheet press bending system for bending hot glass sheets by conveying a hot glass sheet to below an upper mold that is moved downwardly to receive a hot glass sheet and provide support thereof by upwardly directed gas jets supplied from below a plane of conveyance of a roll conveyor and by a vacuum drawn at the upper mold, and the upper mold is then moved upwardly with the glass sheet supported thereon by contact with two thirds or more of the downwardly facing surface along the length of the glass sheet. When glass sheets are formed with transverse curvature, i.e., curvature in directions that cross each other without any straight line elements, the periphery of the glass sheet has excess glass that can cause excess pressure between the mold and the glass sheet at the center of the glass sheet and thereby result in undesirable optics both as to reflection and to transmission in the central viewing area of the glass.

In connection with the type of system disclosed by the aforementioned U.S. Pat. No. 4,661,141, see also U.S. Pat. No. 5,900,034 Mumford et al.; U.S. Pat. No. 5,906,668 Mumford et al.; U.S. Pat. No. 5,917,107 Ducat et al.; U.S. Pat. No. 5,925,162 Nitschke et al.; U.S. Pat. No. 6,032,491 Nitschke et al.; U.S. Pat. No. 6,079,094 Ducat et al.; U.S. Pat. No. 6,173,587 Mumford et al.; U.S. Pat. No. 6,418,754 Nitschke et al.; U.S. Pat. No. 6,718,798 Nitschke et al.; and U.S. Pat. No. 6,729,160 Nitschke et al.

SUMMARY

An object of the present invention is to provide an improved method for three stage forming a hot glass sheet with transverse curvature.

In carrying out the above object, the three stage method for forming a hot glass sheet with transverse curvature is performed by initially forming the glass sheet against a downwardly facing first upper mold so as to have curvature in a first direction and straight line elements in a second direction transverse to the first direction. The glass sheet is then transferred from the first upper mold onto an upwardly facing lower mold having curvature in the first direction and permitting the glass sheet to sag under gravity to have some curvature in the second direction as well as curvature in the first direction. Thereafter the glass sheet is press formed between the lower mold and a downwardly facing second upper mold that has transverse curvature and is complementary to the lower mold so the glass sheet has transverse curvature corresponding to the shapes of the lower mold and the second upper mold.

The three stage forming method for forming a hot glass sheet with transverse curvature is also performed by conveying the hot glass sheet on a roll conveyor into a heated chamber of a forming station to below the first upper mold at a pickup position thereof within the heated chamber above the conveyor, with the first upper mold having a downwardly facing surface of a convex shape with curvature in the first direction and straight line elements in the second direction transverse to the first direction, with the first upper mold in the pickup position being spaced horizontally from the lower mold, which faces upwardly, and from the second upper mold which is located above the lower mold, and with the second upper mold located within the heated chamber above the elevation of the conveyor and having a downwardly facing surface of a convex shape with its transverse curvature. The first upper mold is supported on elongated beams that are supported by rollers for horizontal movement within the heated chamber under the operation of a horizontal actuator for horizontal movement of the first upper mold between the pickup position above the roll conveyor and a delivery position below the second upper mold and above the lower mold, and the rollers are supported on vertical actuators that move the rollers and the elongated beams and the first upper mold supported thereon vertically. The first upper mold at its pickup position is moved downwardly from an upper position to a lower position adjacent the glass sheet on the conveyor and upwardly directed gas lift jets are supplied to lift the glass sheet from the conveyor and provide the initially forming of the glass sheet against the downwardly facing surface of the first upper mold, the first upper mold is then moved upwardly to its upper position with the glass sheet supported by the first upper mold, and a vacuum is drawn by a vacuum source at the first upper mold to support the glass sheet thereon. The first upper mold at its upper position and the glass sheet supported thereon by the vacuum are moved horizontally within the heated chamber from the pickup position to the delivery position below the second upper mold and above the lower mold which has an upwardly facing surface of a concave shape complementary to the convex shape of the downwardly facing surface of the second upper mold. Subsequently the vacuum drawn at the first upper mold is terminated in the delivery position to release the glass sheet onto the lower mold, the first upper mold is moved back to the pickup position, the second upper mold is moved from an upper position downwardly to cooperate with the lower mold in the press forming of the glass sheet, and then the second upper mold is moved upwardly to its upper position with the press formed glass sheet supported on the second upper mold by vacuum drawn by the vacuum source at its downwardly facing surface. A delivery mold is then moved to below the press formed glass sheet on the second upper mold in its upper position whereupon the vacuum is terminated to release the glass sheet from the second upper mold onto the delivery mold which is then moved out of the forming station for delivery of the press formed glass sheet. A controller is operated to control the roll conveyor, the horizontal actuator and the vertical actuators as well as the first upper mold moved that is thereby, the vacuum source, and the delivery mold to perform the press forming of the glass sheet and its delivery.

In the other disclosed practice, the lower mold has a ring shape that supports the glass sheet as it sags by gravity, and a support pad controls sagging of the supported hot glass sheet within the ring shape of the lower mold. As disclosed, at least one press member assists the lift jet array in initially forming the glass sheet against the downwardly facing surface of the first upper mold. Also, the delivery mold moves the press formed glass sheet from the forming station to a quench station for quenching.

The objects, features and advantages of the present invention are readily apparent from the following detailed description of the preferred embodiment when taken in connection with the referenced drawings.

BRIEF DESCRIPTION OF THE DRAWINGS

FIG. 1 is a schematic elevational view of a glass sheet processing system including a three stage forming station that performs the method of the invention for three stage forming of a hot glass sheet.

FIG. 2 is a sectional view taken through the forming station along the direction of line 2-2 in FIG. 1 and illustrates a forming apparatus that includes first and second upper molds, a lower mold and a delivery mold for performing three stage forming of a hot glass sheet with transverse curvature.

FIGS. 12 and 13 are partial views of FIG. 11 illustrating the glass sheet processing during a cycle of operation of the system.

DETAILED DESCRIPTION

Figure 3:
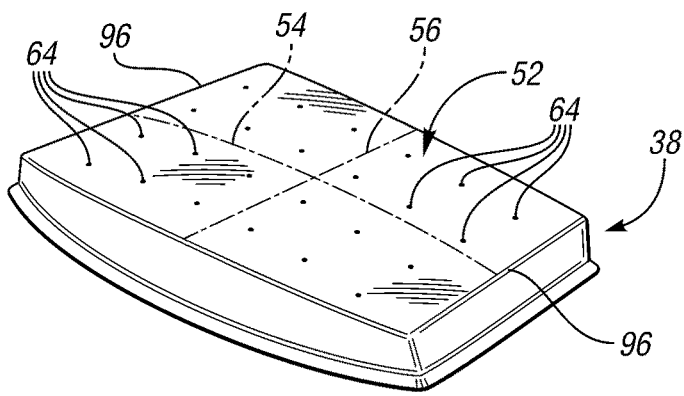
FIG. 3 is a perspective view of the first upper mold with its normally downwardly forming convex surface shown facing generally upwardly for purposes of illustration.

As required, a detailed embodiment of the present invention is disclosed herein; however, it is to be understood that the disclosed embodiment is merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to practice the present invention.

With reference to FIG. 1, a glass sheet forming system generally indicated by 20 includes a furnace 22 having a heating chamber 24 for providing a heated ambient for heating glass sheets. A conveyor 26 of the system conveys the heated glass sheet in a generally horizontally extending orientation and is preferably of the roll conveyor type including rolls 28 like those disclosed by U.S. Pat. Nos.: U.S. Pat. No. 3,806,312 McMaster; U.S. Pat. No. 3,934,970 McMaster et al., U.S. Pat. No. 3,947,242 McMaster et al.; and U.S. Pat. No. 3,994,711 McMaster et al. A three stage forming station 30 of the system 20 performs the method of the invention. The forming station 30 has a press forming construction somewhat similar to that of the disclosure of the aforementioned U.S. Pat. No. 4,661,141 and the other United States Patents set forth in the above Background section of this application. Furthermore, the forming station 30 has an insulated housing 32 defining a heated chamber 34 in which forming apparatus 36 of the forming station is located as also shown in FIG. 2.

As illustrated in FIG. 2, the glass sheet forming apparatus 36 includes a first upper mold 38 that functions during a first stage of the hot glass sheet forming, a second upper mold 40 that functions during a press forming stage of the hot glass sheet forming, a lower mold 42 that receives the glass sheet G from the first upper mold 38 for gravity sagging and moves the glass sheet from the first upper mold to the second upper mold 40 and cooperates with the second upper mold to provide the press forming, and a delivery mold 44 that receives the formed glass sheet from the second upper mold 40 for delivery from the forming station 30, which delivery is to a quench station 46 as disclosed.

Figure 6:
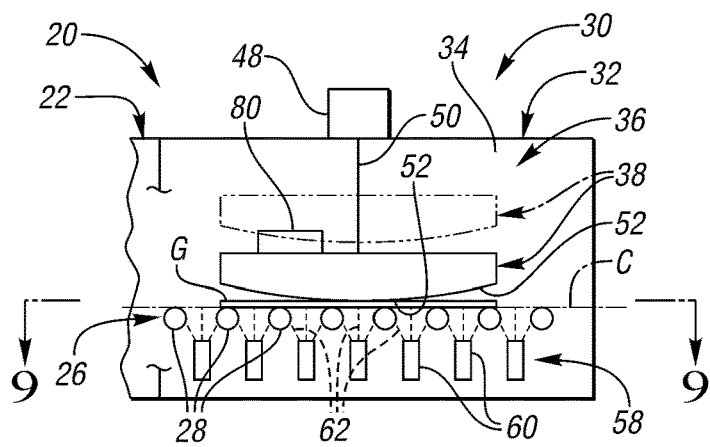
FIG. 6 is a view taken along the direction of line 6-6 of FIG. 2 to show the initial pickup of the hot glass sheet from the conveyor by the first upper mold for the initial forming.

With continuing reference to FIG. 2, a schematically indicated actuator 48 such as one or more cylinders has a connection(s) 50 to the first upper mold 38 to provide movement thereof between an upper position above the roll conveyor 26 and as shown in FIG. 6 a lower position adjacent the roll conveyor and a conveyed hot glass sheet G. The first upper mold 38 has a downwardly facing surface 52 which has a downwardly convex shape shown in FIG. 6 and illustrated by the phantom line 54 in FIG. 3. Mold surface 52 also has straight line elements such as illustrated by phantom line 56 and may be provided by a cylindrical shape or a partial conical shape.

A gas lift jet array 58 in the forming station as illustrated in FIG. 6 is located below the plane of conveyance C of the hot glass sheet and includes gas jet pumps 60 that supply upwardly directed gas jets 62 for lifting the glass sheet G upwardly from the roll conveyor 26 to initially form and support the glass sheet against the downwardly facing surface 52 of the first upper mold 38 which is then moved upwardly to its upper position with the glass sheet supported against its downwardly facing surface as shown in FIG. 2. The gas jet pumps 60 are of the type disclosed by U.S. Pat. No. 4,204,854 McMaster et al. and U.S. Pat. No. 4,356,018 McMaster et al. such that a primary gas flow therefrom induces a secondary gas flow many times the extent of the primary gas flow in order to provide the lifting. A downwardly facing surface 52 of the first upper mold 38 also has an array of vacuum holes 64 through which a vacuum may be drawn to also provide initial lifting of the glass sheet and to then support the glass sheet as is hereinafter described.

Figure 4:
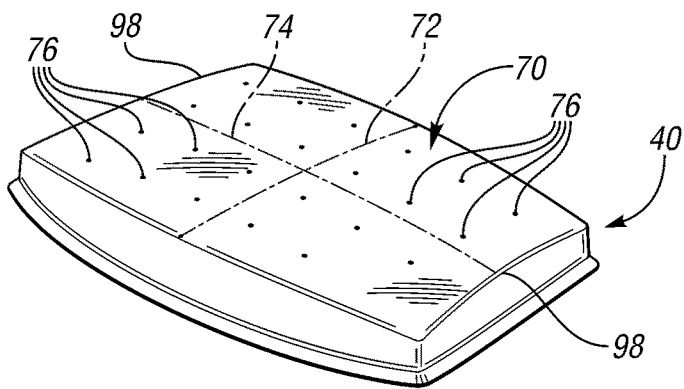
FIG. 4 is a perspective view of the second upper mold with its normally downwardly forming convex surface also shown facing generally upwardly for purposes of illustration.

As shown in FIG. 2, the second upper mold 40 is spaced horizontally within the heated chamber 34 of the forming station housing 32 and is movable vertically by an actuator 66 and a connection 68 like the actuator and connection associated with the first upper mold 38. This vertical movement of the second upper mold 40 is between an upper position located above the elevation of the plane of conveyance and a lower position (FIG. 7) closer to the elevation of the plane of conveyance. The second upper mold 40 has a downwardly facing surface 70 of a downwardly convex shape with curvature in transverse directions without any straight line elements as shown by the curved phantom lines 72 and 74 in FIG. 4. The second upper mold 40 also has an array of vacuum holes 76 in its downwardly facing surface 70 for forming and supporting the heated glass sheet against the second upper mold during the forming cycle.

It should also be mentioned that the first and second upper molds 38 and 40 can also be moved upwardly and downwardly at the same time by a single actuator instead of separate actuators.

As shown in FIG. 2, a schematically indicated vacuum source 78 is disclosed as operable to provide a vacuum at the downwardly facing surfaces 52 and 70 of the first and second upper molds 38 and 40. Actually, this source of vacuum can be provided by positive pressure air supplied to gas jet pumps 80 and 81 on the first and second upper molds 38 and 40 and are preferably of the type disclosed by U.S. Pat. No. 4,202,681 McMaster and U.S. Pat. No. 4,222,763 McMaster so as to be capable of drawing greater and lesser extents of vacuums as well as providing positive pressure air for providing glass sheet release during the forming operation as is hereinafter more fully described.

Figure 5:
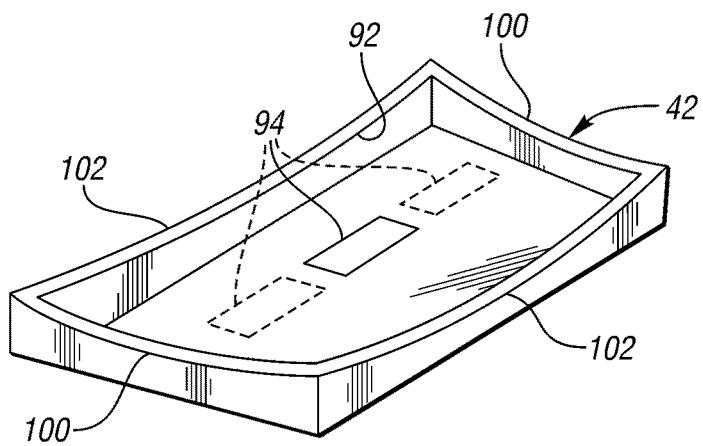
FIG. 5 is a perspective view of the lower mold which receives the initially formed glass sheet from the first upper mold for gravity sagging and movement to below the second upper mold for subsequent press forming.
Figure 7:
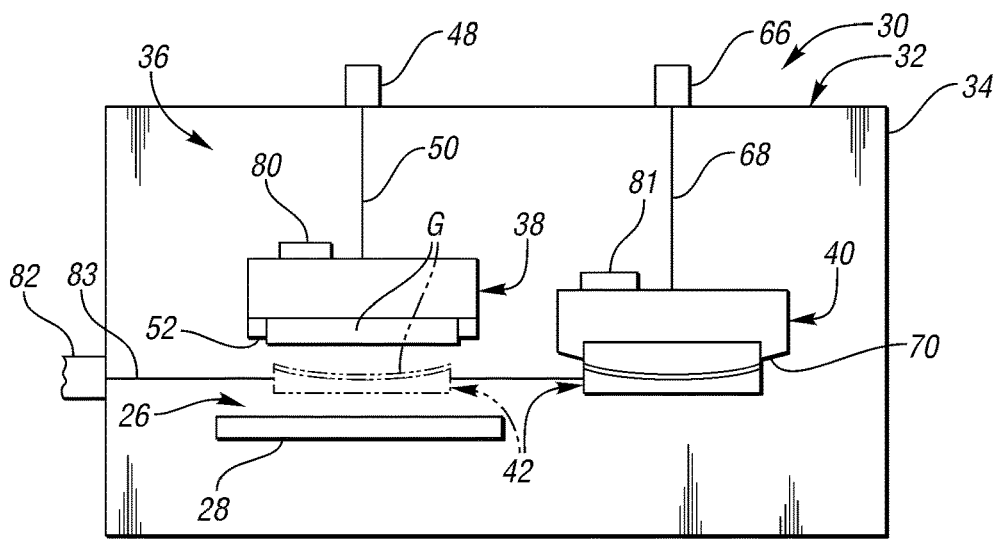
FIG. 7 is an elevational view of the forming station taken in the same direction as FIG. 2 and illustrates the movement of the glass sheet on the lower mold from the first upper mold to below the second upper mold for the press forming with transverse curvature.

The lower mold 42 as best illustrated in FIG. 5 faces upwardly with an upwardly concave shape in transverse directions complementary to the downwardly convex shape of the downwardly facing surface 70 of the second upper mold 40. This lower mold 42 is movable by an actuator 82 and connection 83 horizontally within the heated chamber 34 of the forming station housing 32 at a location above the plane of conveyance of the glass sheet to below the first upper mold 38 in its upper position as shown in FIG. 7 with the glass sheet supported against its downwardly facing surface 52. The first upper mold 38 is then movable downwardly to release the glass sheet for transfer onto the lower mold 42. The release of the glass sheet can be provided by the termination of the vacuum drawn and the termination of the upwardly directed gas jets provided by the gas jet array 58 previously described, as well as by providing positive pressure gas to the mold surface 52. The first upper mold 38 is then moved upwardly to its upper position and the lower mold 42 and the glass sheet supported thereon are moved horizontally to below the second upper mold 40 while in its upper position as shown in FIG. 2. During this movement, the glass sheet sags by gravity toward the shape of the lower mold 42 with curvature in transverse directions. The second upper mold 40 is then moved downwardly from its upper position shown in FIG. 2 to its lower position shown in FIG. 7 to cooperate with the lower mold 42 to press form the glass sheet with curvature in transverse directions, and the second upper mold then has a vacuum drawn at its downwardly facing surface 70 to support the glass sheet and is moved upwardly to its upper position shown in FIG. 8.

Figure 8:
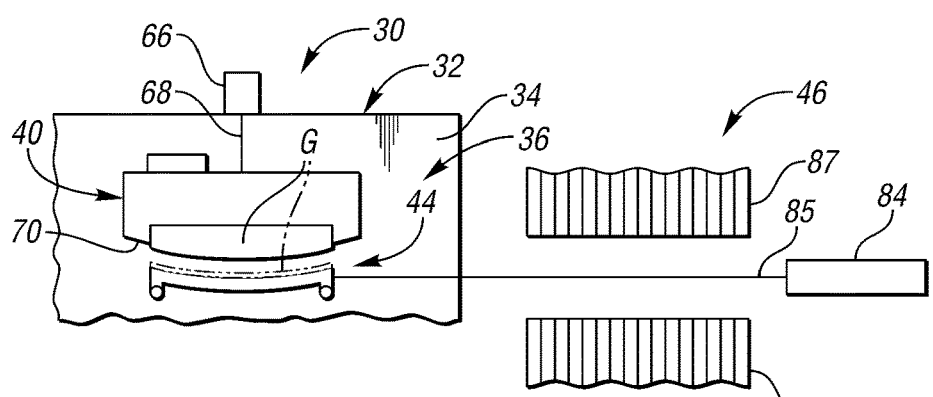
FIG. 8 is an elevational view taken in the same direction as FIG. 7 and illustrates the operation of the delivery mold for delivering the formed glass sheet from the forming station.

The glass forming operation continues by the lower mold 42 being moved out from under the second upper mold 40 and back under the first upper mold 38 as shown by phantom line representation in FIG. 7, while the delivery mold 44 is moved from its FIG. 2 position at the quench station 46 to below the second upper mold 40 to receive the glass sheet as shown in FIG. 8 as the vacuum is terminated at the second upper mold so the glass sheet drops onto the delivery mold which is then moved by its actuator 84 and connection 85 out of the forming station for delivery of the pressed formed glass sheet such as by quenching in the quench station 46 between lower and upper quench heads 86 and 87 as shown in FIG. 2.

A controller 88 shown in FIG. 1 has a bundle of connections 90 that operate the roll conveyor 26, the first upper mold 38, the second upper mold 40, the lower mold 42, the delivery mold 44, the gas lift jet array 58, the vacuum source 78 and the quench station 46 to perform the press forming of the glass sheet, its delivery and quenching.

During development of the forming station 30, the inventors have determined that glass sheet forming with transverse curvature upon initial forming on an upper mold can cause buckling at the central viewing area of the glass sheet due to excess glass at the glass sheet periphery when the flat glass sheet assumes the curvature in crossing directions with no straight line elements, and such buckling results in distorted optics as to transmission and/or reflection in the central viewing area of the glass. It has also been determined that use of a first upper mold with straight line elements during the initial stage of forming, then allowing the gravity sag forming on the lower mold to begin the transverse curvature, and subsequently performing the final press forming of the glass sheet reduces optical distortions both as to transmission and reflection in the central view area of the formed glass sheet.

Also, for purposes of this application, the term "straight line elements" means straight lines between two opposite extremities of the first upper mold surface 52 and of the glass sheet after the first stage of forming, which straight lines have midpoints from which the mold surface and initially formed glass sheet are spaced no more than about 0.5%, and preferably no more than about 0.3%, of the distance between the extremities.

In the three stage forming station disclosed, the vacuum source 78 shown in FIG. 2 is operated by the controller 88 shown in FIG. 1 through the bundle of connections 90 to provide a vacuum to the downwardly facing surface 52 of the first upper mold in order to cooperate with the gas lift jet array 58 in lifting the glass sheet G from the roll conveyor 26 into contact with the first upper mold at its downwardly facing surface 52 for initially forming and support of the glass sheet. After the glass sheet G is moved upwardly and contacts the downwardly facing surface 52 of the first upper mold, the controller 88 disclosed terminates the operation of the gas lift jet array 58 while continuing to provide the vacuum that is then the sole support of the glass sheet on the first upper mold.

As illustrated in FIG. 5, the lower mold 42 has a ring shape that defines the upwardly concave shape in transverse directions complementary to the downwardly facing convex shape of the second upper mold surface 70. This ring shape of the lower mold 42 defines an open center 92 so as to contact the glass sheet at its periphery and allow gravity sagging; however, in order to control the gravity sagging of the glass sheet during its transfer between the first and second upper molds 38 and 40, the lower mold 42 may be provided with one or more pads 94 in its open center.

The manner in which the forming apparatus is constructed and operates to initially form the glass sheets with straight line elements at the first stage of forming, begin the transverse curvature by the gravity sagging on the lower mold and subsequently completing the transverse curvature by the press forming reduces central deformation of the formed glass both as to transmission and reflection at its central viewing area. More specifically, during the first stage of forming on the first upper mold, the formed glass sheet with straight line elements only has curvature between the end portions 96 of the first upper mold 38 so that initially there is no excess peripheral glass for causing deformation. Subsequent gravity sagging of the initially formed glass sheet on the lower mold initiates the transverse forming without forcing deformation of the glass due to the excess peripheral glass as the glass forms transversely. During the final press forming on the second upper mold 40 shown in FIG. 4, the end portions 100 and side portions 102 of the lower mold 42 shown in FIG. 5 press the glass sheet against the downwardly facing surface 70 of the second upper mold 40 to provide the final transverse curvature of the glass sheet with decreased distortion in the central viewing area of the formed glass sheet.

When the glass sheet has a generally rectangular shape, the initial forming will be in a cylindrical shape, and when the glass sheet is of a generally trapezoidal shape the initial forming will be of a partial conical shape, both of which have straight line elements so there is no excess glass sheet at the periphery of the glass sheet during the first stage of forming. As described above, the subsequent gravity sag forming on the lower mold to start forming the transverse curvature and the final press forming complete the glass sheet forming with transverse curvature with reduced central viewing area distortion.

Figure 9:
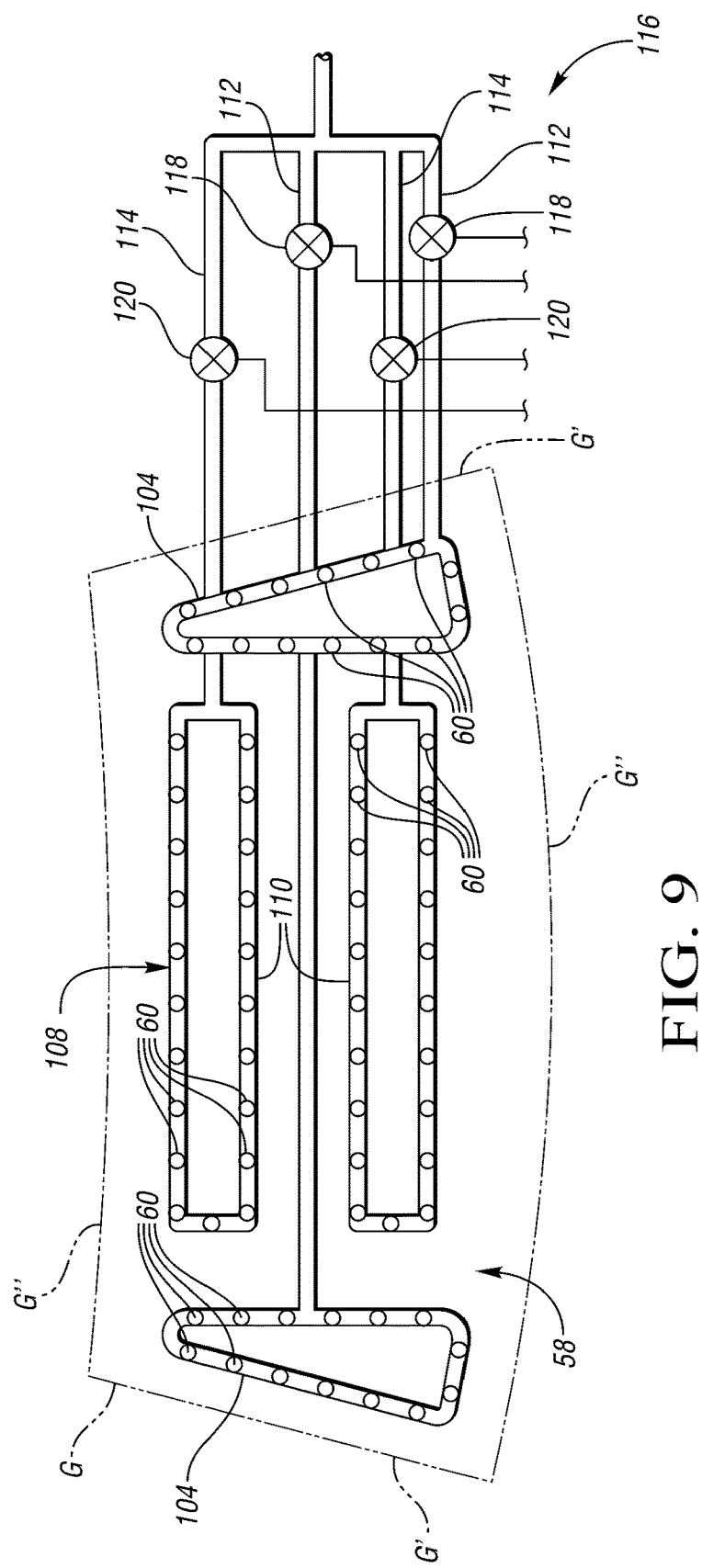
FIG. 9 is a plan view taken along the direction of line 9-9 in FIG. 6 to illustrate a gas lift jet array that operates to perform the initial pickup of the glass sheet from the conveyor by the first upper mold.

With reference to FIG. 9, the gas lift jet array 58 disclosed includes a pair of end portions 104 that are aligned with the end portions G' of the glass sheet to initially provide their lifting and support on the first upper mold 38, and the gas lift jet array also includes a central portion 108 having a pair of branches 110 for providing the support and lifting of the intermediate portion G" of the glass sheet. Pressurized gas that is heated during its flow into and then through a heating path in the heated chamber supply conduits 112 that supply pressurized gas to the end portions 104 and conduits 114 that supply pressurized gas to the central portion 108 in both of its branches 110. A control generally indicated by 116 includes valves 118 that adjustably control the pressure supplied to the conduits 112 feeding the end portions 104 and the control 116 also includes valves 120 that adjustably control the gas pressure supplied to the branches 110 of the central portion 108. Of course, the valving and control for supplying the gas array end portions 104 and the central portion 108 can also be constructed in different ways than the specific way shown to adjustably control the amount of lifting and support at the end portions and intermediate portion of the glass sheet. This operation takes place after the downward movement of the first upper mold to receive the glass sheet for the first stage of forming and can then be terminated while the vacuum continues to be drawn at the first upper mold surface to continue the support of the glass sheet. The vacuum is continued until release of the glass sheet onto the lower mold 42 and such termination may be accompanied by supply of positive pressure air supplied by the gas jet pump 80.

Figure 10:
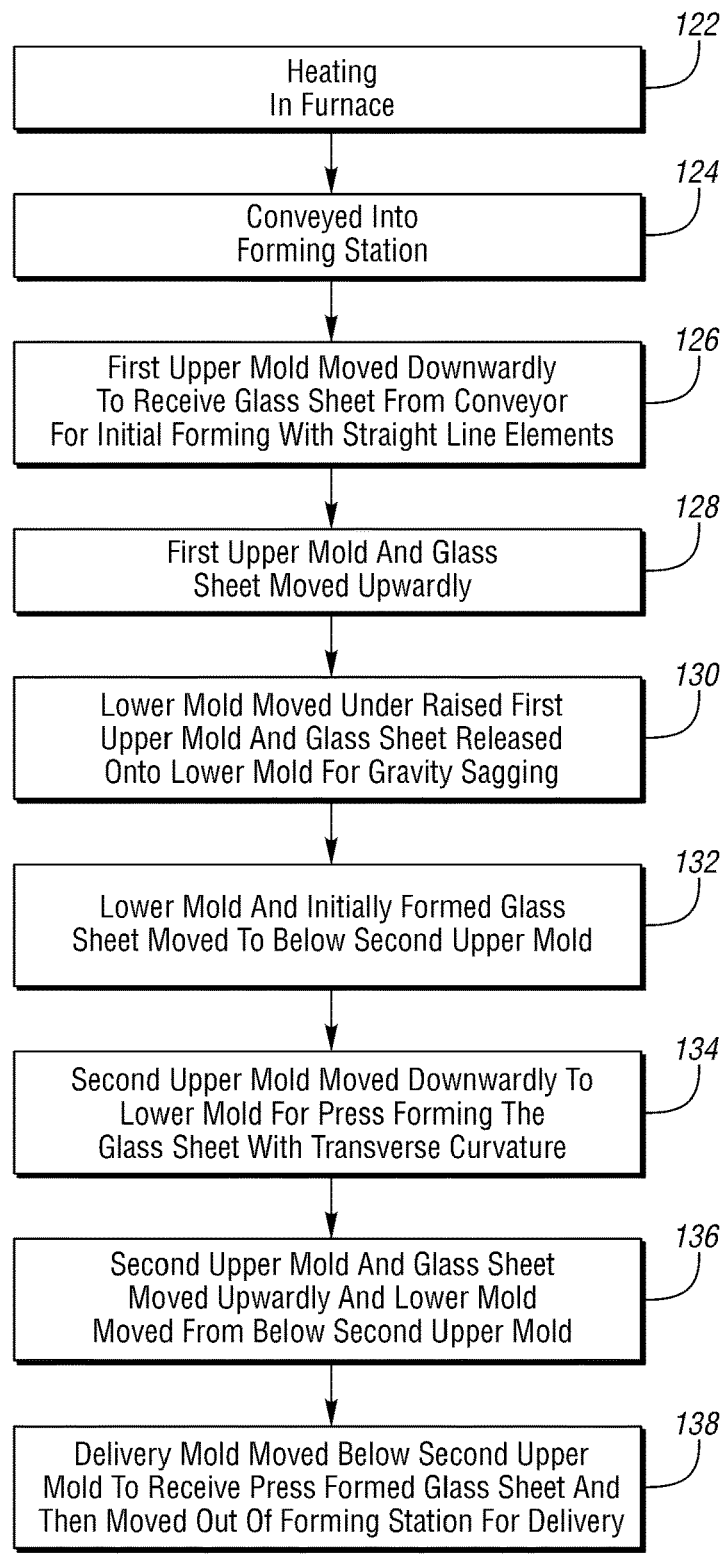
FIG. 10 is a flow chart that illustrates the three stage hot glass sheet forming operation.

With reference to the flow chart of FIG. 10, the press forming operation begins by the heating 122 of the glass sheet G in the furnace and its subsequent conveyance 124 after heating into the forming station to begin the press forming operation. Then the downward movement of the first upper mold as illustrated at 126 and its receipt of the glass sheet G for the initial forming with curvature in the first direction and straight line elements in the second transverse direction is followed by the first upper mold and glass sheet upward movement 128 and subsequently by the lower mold movement 130 under the raised first upper mold and release of the glass sheet onto the lower mold for the gravity sagging that starts the transverse curvature. The lower mold and initially formed glass sheet are then moved as shown by 132 to below the second upper mold which is then moved downwardly as shown by 134 to press form the initially formed glass sheet with transverse curvature. The second upper mold is then moved upwardly as shown at 136 and the lower mold is moved out from below the second upper mold, followed by the delivery mold movement 138 below the second upper mold to receive the formed glass sheet for delivery. The downward second upper mold movement shown by 134 initiates the press forming of the glass sheet with the lower mold as vacuum is supplied to the second upper mold to provide the press forming in transverse directions with optics that are enhanced by the initial forming of the glass sheet with straight line elements followed by the gravity sagging before the press forming.

Figure 11:
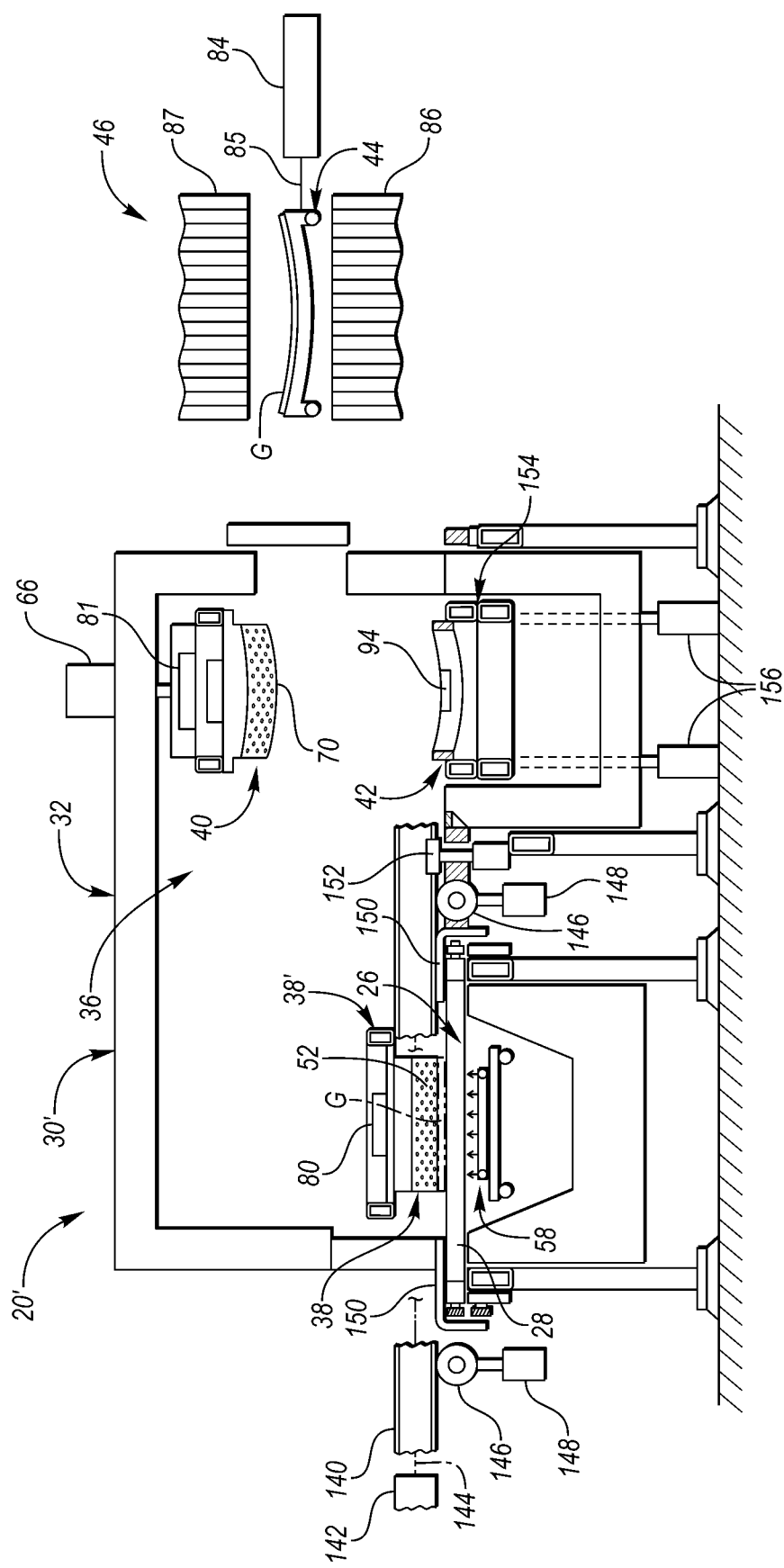
FIG. 11 is a view taken in the same direction as FIG. 2 but illustrating another embodiment of the three stage forming station which carries out the method of the invention for three stage forming of the hot glass sheet.

With reference to FIG. 11, another embodiment of a three stage forming station 30' performs the method of the invention and has many of the same components that operate like those of the previously described embodiment such that like references numerals are applied to like components and much of the previous description is applicable and thus will not be repeated.

In the forming station 30' illustrated in FIGS. 11-13, a heated glass sheet G on the conveyor 26 is received by the first mold 38 and moved horizontally from its pickup position shown in FIG. 11 to a delivery position shown in FIG. 12 where the lower mold 42 is located, which is different from the prior embodiment wherein the lower mold provides the horizontal movement. As such, while there is gravity sagging on the lower mold in this embodiment, there is less time for such gravity sagging so that the shape can be more accurately controlled. After the glass sheet is deposited on the lower mold 42 by the first upper mold 38, the first upper mold 38 moves back from its delivery position of FIG. 12 to its pickup position of FIG. 11 and the second upper mold 40 moves downwardly as shown in FIG. 13 to cooperate with the lower mold in press forming the glass sheet as previously described. After the press forming, the second upper mold 40 moves upwardly with the glass sheet supported against its downwardly facing surface 70 by a drawn vacuum as previously described and the delivery mold 44 shown in FIG. 11 is moved from the quench station 46 into the forming station 30' to receive the glass sheet for movement back out to the quench station between the lower and upper quench heads 86 and 87 for quenching also as previously described.

As shown in FIG. 11, the first upper mold 38 has a frame 38' that is supported by elongated beams 140 (only one shown) that are moved by an actuator 142 through a connection 144. These beams 140 are supported by associated rollers 146 that are mounted by actuators 148 to provide vertical movement of the beams and hence vertical movement of the first upper mold 138 during its operation. More specifically, the first upper mold 38 can be moved downwardly to about one half inch (12 to 15 mm) from the conveyor 26 for the initial pickup of the glass sheet and can then be moved upwardly so as to move above drive mechanism covers 150 located the ends of the conveyor rolls 28 to reduce heat flow from the interior of the forming station to the factory ambient. Lateral rollers 152 also contact the beams to provide lateral positioning during movement of the first upper mold 38 between its pickup position shown in FIG. 11 and its delivery position shown in FIG. 12.

The forming station 30' illustrated in FIGS. 11-13 thus also has three stages of operation wherein the glass sheet is formed on the first upper mold 38 with curvature in a first direction and straight line elements in a second direction transverse to the first direction, by gravity on the lower mold 42 after receipt thereby from the first upper mold 38 in its delivery position shown in FIG. 12, and finally by the press forming between the second upper mold 40 and the lower mold 42 as shown in FIG. 13.

The lower mold 42 as illustrated is supported by a framework 154 that is supported by actuators 156, such as screw jacks, for vertical movement. This vertical movement can be downward to allow the first upper mold 38 to move over the lower mold 42 and then upward so that the release of the glass sheet is at a more closely spaced relationship to control positioning. In addition, the vertical movement of the lower mold 42 can also be used in cooperation with the vertical movement of the second upper mold 40 to perform the press bending.

Figure 14:
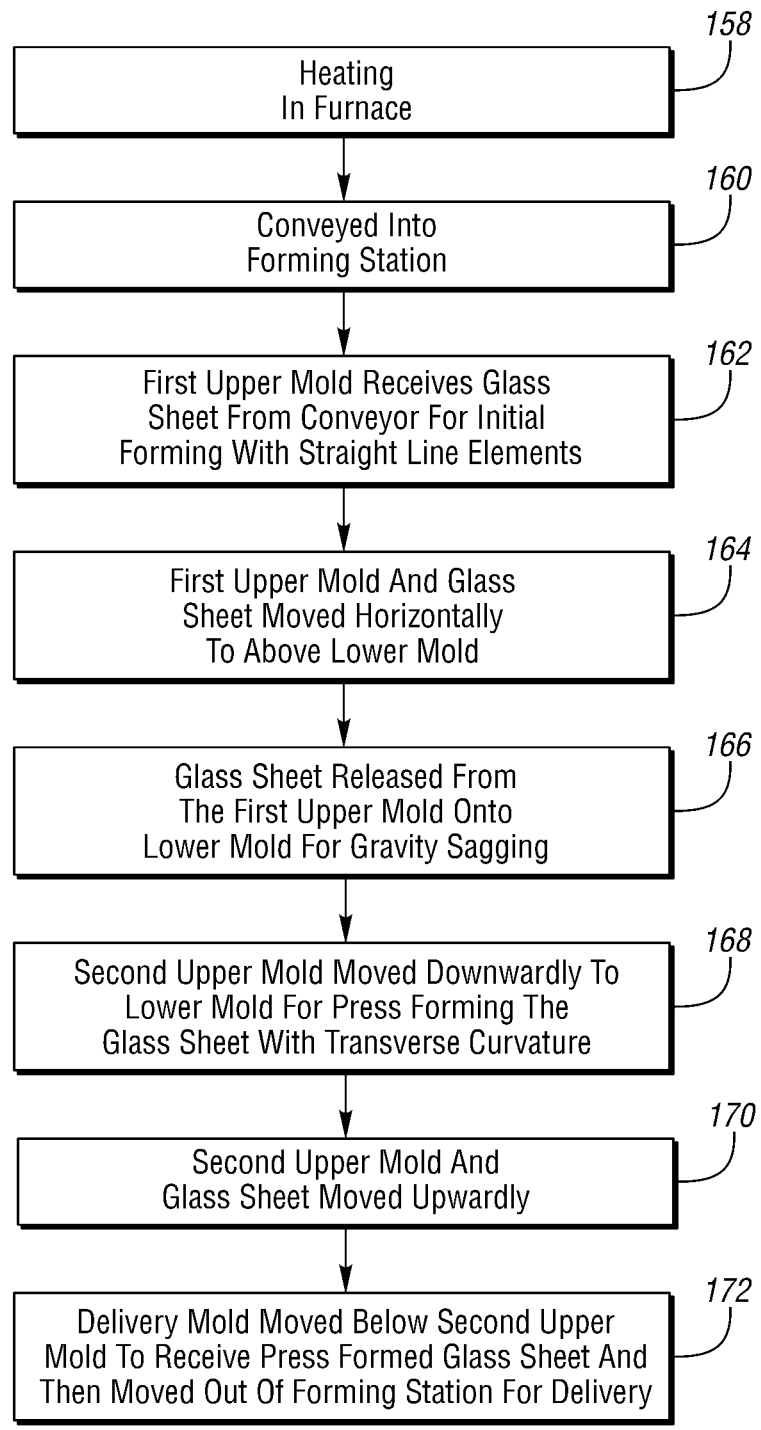
FIG. 14 is a flow chart that illustrates the three stage hot glass sheet forming operation of the forming station embodiment of FIGS. 11-13.

With reference to the flow chart of FIG. 14, the embodiment of FIGS. 11-13 performs the press forming operation beginning by the heating 158 of the glass sheet G in the furnace and its subsequent conveyance 160 into the forming station, followed by the first upper mold receiving the glass sheet from the conveyance for initial forming with straight line elements in the first stage, and then the horizontal movement 164 of the first upper mold and the glass sheet to above the lower mold. Then, the glass sheet release 166 from the first upper mold onto the lower mold provides gravity sagging in the second stage which can be performed in a shorter time than when the lower mold moves horizontally, and the second upper mold is moved downwardly at 168 to the lower mold for press forming with transverse curvature in the third stage, and the second upper mold and glass sheet are moved upwardly at 170 followed by the delivery mold movement 172 below the second upper mold to receive the press formed glass sheet and then move it out of the forming station for delivery.

Both embodiments can have reduced cycle time by the vertical positioning of the constructions disclosed. In the embodiment of FIGS. 1-10, the vertical positioning permits both the lower mold 42 and the delivery mold 44 to be below the second upper mold 40 at the same time so successive cycles overlap to reduce cycle time. In the embodiment of FIGS. 11-14, the vertical positioning permits both the first upper mold 38 and the delivery mold 44 to be below the second upper mold 40 at the same time so successive cycles overlap to reduce cycle time.

In both embodiments, it is also possible to assist the lift jets with mechanical pressing of the glass sheet against the first upper mold 38 at its downwardly facing surface 52 so as to ensure completed glass contact therewith even with abrupt curvature at one or more locations. This type of pressing can be performed by having a press member, or a pair of press members, mounted on the first upper mold 38 and operated by the controller 88 through an actuator(s) that extends between the upper mold and the press member which may pivot or otherwise move relative to the upper mold. See U.S. Pat. No. 4,514,208 Nitschke, which discloses mechanical pressing against an upper mold.

All of the previously mentioned patents are assigned to the applicant of the present application and are hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A three stage method for forming a hot glass sheet with transverse curvature comprising:

initially forming the glass sheet against a downwardly facing first upper mold that has curvature in a first direction and straight line elements in a second direction transverse to the first direction;

then transferring the glass sheet from the first upper mold onto an upwardly facing lower mold having curvature in the first direction and permitting the glass sheet to sag under gravity to have some curvature in the second direction as well as curvature in the first direction;

thereafter press forming the glass sheet between the lower mold and a downwardly facing second upper mold that has transverse curvature and is complementary to the lower mold so the glass sheet has transverse curvature corresponding to the shapes of the lower mold and the second upper mold; and the method further being performed by:

conveying the hot glass sheet on a roll conveyor into a heated chamber of a forming station to below the first upper mold at a pickup position thereof within the heated chamber above the conveyor, with the first upper mold having a downwardly facing surface of a convex shape with curvature in the first direction and straight line elements in the second direction transverse to the first direction, with the first upper mold in the pickup position being spaced horizontally from the lower mold, which faces upwardly, and from the second upper mold which is located above the lower mold, and with the second upper mold located within the heated chamber above the elevation of the conveyor and having a downwardly facing surface of a convex shape with its transverse curvature;

supporting the first upper mold on elongated beams that are supported by rollers for horizontal movement within the heated chamber under the operation of a horizontal actuator for horizontal movement of the first upper mold between the pickup position above the roll conveyor and a delivery position below the second upper mold and above the lower mold, and supporting the rollers on vertical actuators that move the rollers and the elongated beams and the first upper mold supported thereon vertically;

moving the first upper mold at its pickup position downwardly from an upper position to a lower position adjacent the glass sheet on the roll conveyor and supplying upwardly directed gas lift jets to lift the glass sheet from the conveyor and provide the initial forming of the glass sheet against the downwardly facing surface of the first upper mold, the first upper mold then being moved upwardly to its upper position with the glass sheet supported by the first upper mold, and a vacuum being drawn by a vacuum source at the first upper mold to support the glass sheet thereon;

then moving the first upper mold at its upper portion and the glass sheet supported thereon by the vacuum horizontally within the heated chamber from the pickup position to the delivery position below the second upper mold and above the lower mold which has an upwardly concave shape complementary to the convex shape of the downwardly facing surface of the second upper mold;

subsequently terminating the vacuum drawn at the first upper mold in the delivery position to transfer the glass sheet onto the lower mold, moving the first upper mold back to the pickup position, moving the second upper mold from an upper position downwardly to cooperate with the lower mold in the press forming of the glass sheet, and then moving the second upper mold upwardly to its upper position with the press formed glass sheet supported on the second upper mold by vacuum drawn by the vacuum source at its downwardly facing surface;

then moving a delivery mold to below the press formed glass sheet on the second upper mold in its upper position whereupon the vacuum is terminated to release the glass sheet from the second upper mold onto the delivery mold which is then moved out of the forming station for delivery of the press formed glass sheet; and operating a controller to control the roll conveyor, the horizontal actuator and the vertical actuators as well as the first upper mold moved that is thereby, the vacuum source, and the delivery mold to perform the press forming of the glass sheet and its delivery.

2. A three stage method for forming a hot glass sheet as in claim 1 wherein the lower mold has a ring shape that supports the glass sheet as it sags by gravity.

3. A three stage method for forming a hot glass sheet as in claim 2 wherein a support pad controls sagging of the supported hot glass sheet within the ring shape of the lower mold.

4. A three stage method for forming the glass sheet as in claim 1 wherein at least one press member assists the gas lift jets in initially forming the glass sheet against the downwardly facing surface of the first upper mold.

5. A three stage method for forming a hot glass sheet as in claim 1 wherein the delivery mold moves the press formed glass sheet from the forming station to a quench station for quenching.

* * * * *